Dec. 13, 1938.  C. F. HIGH  2,139,894
FUEL INJECTION AND MIXTURE CONTROLLING APPARATUS
FOR INTERNAL COMBUSTION ENGINES
Original Filed Aug. 16, 1930  5 Sheets-Sheet 3
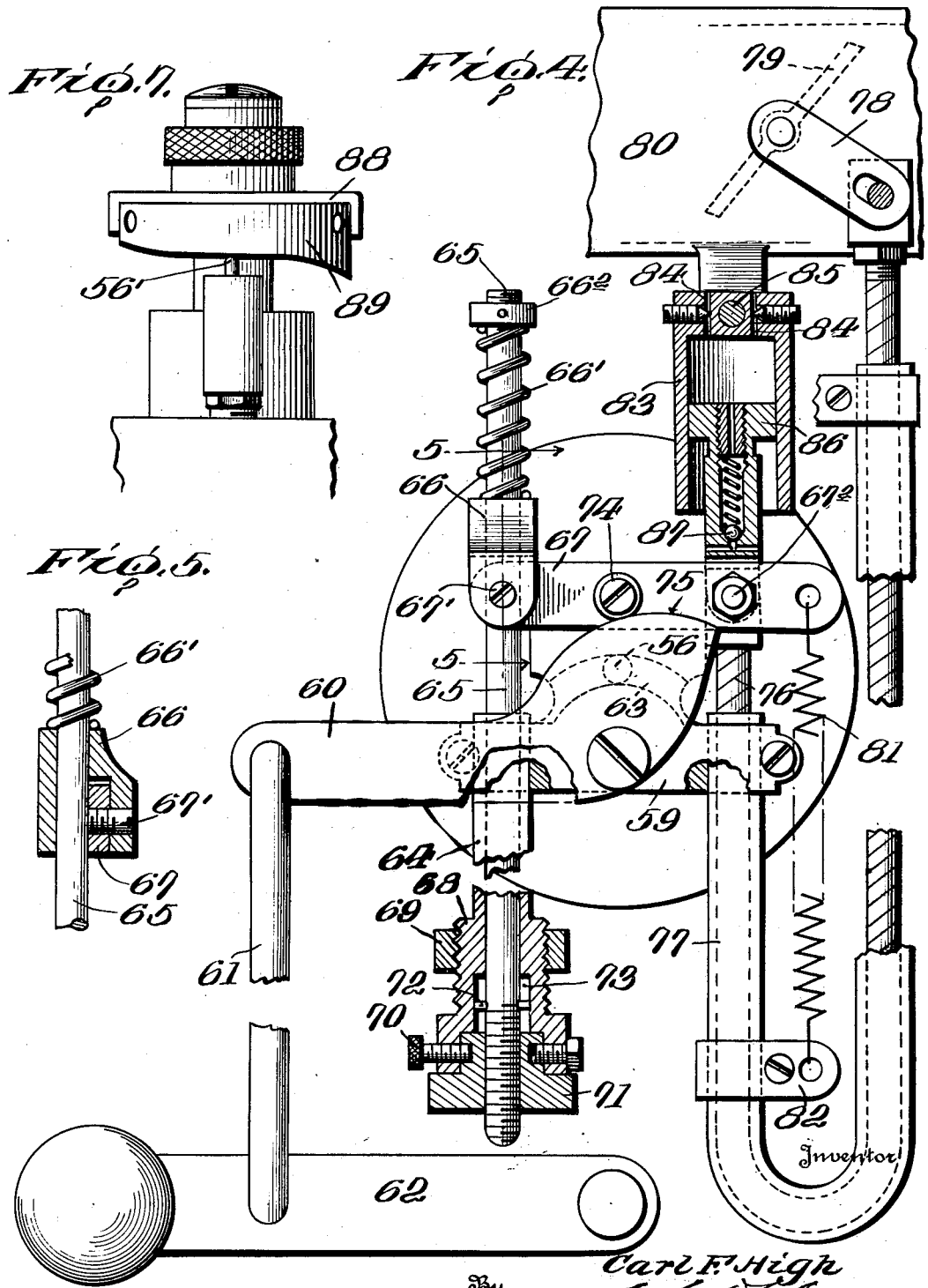

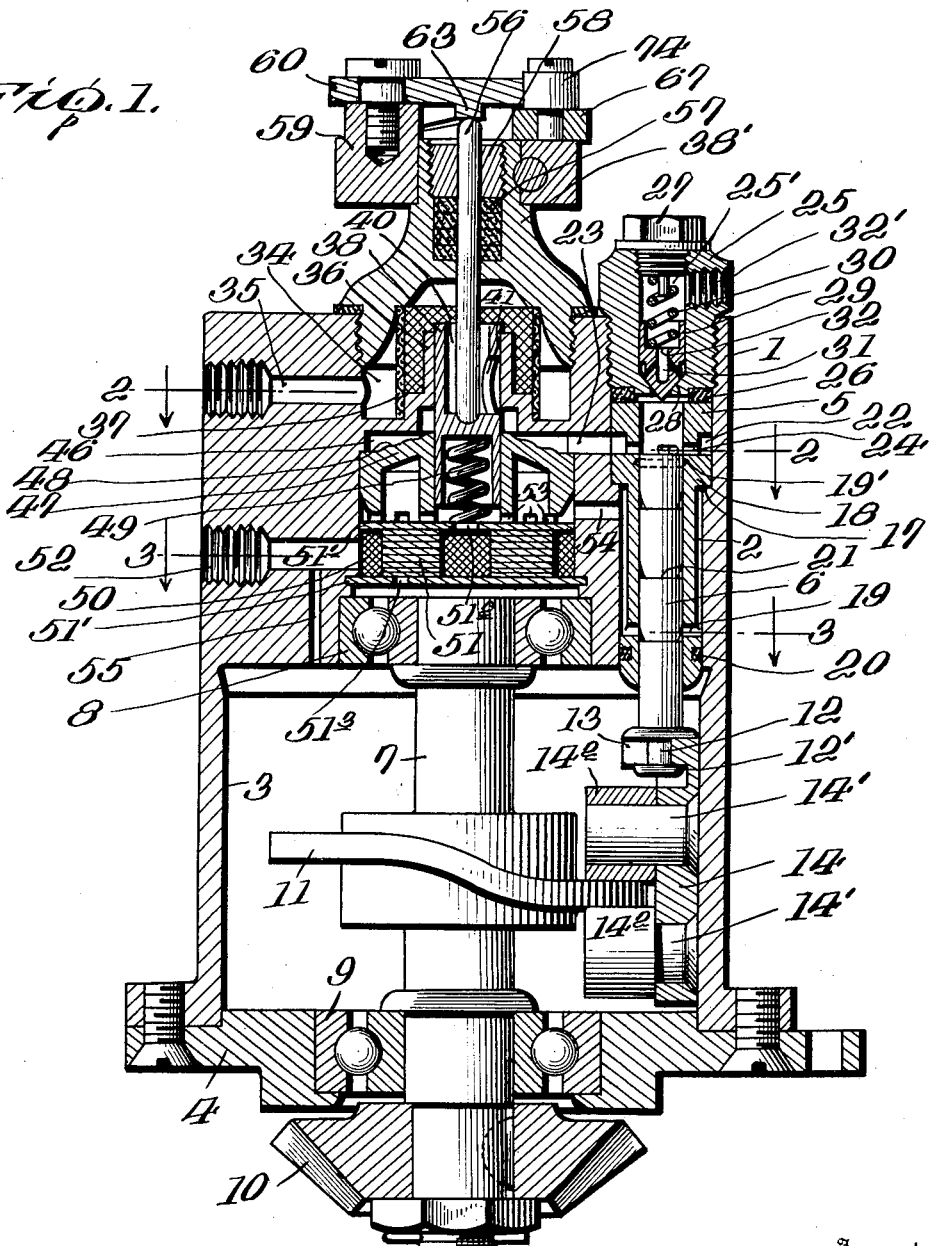

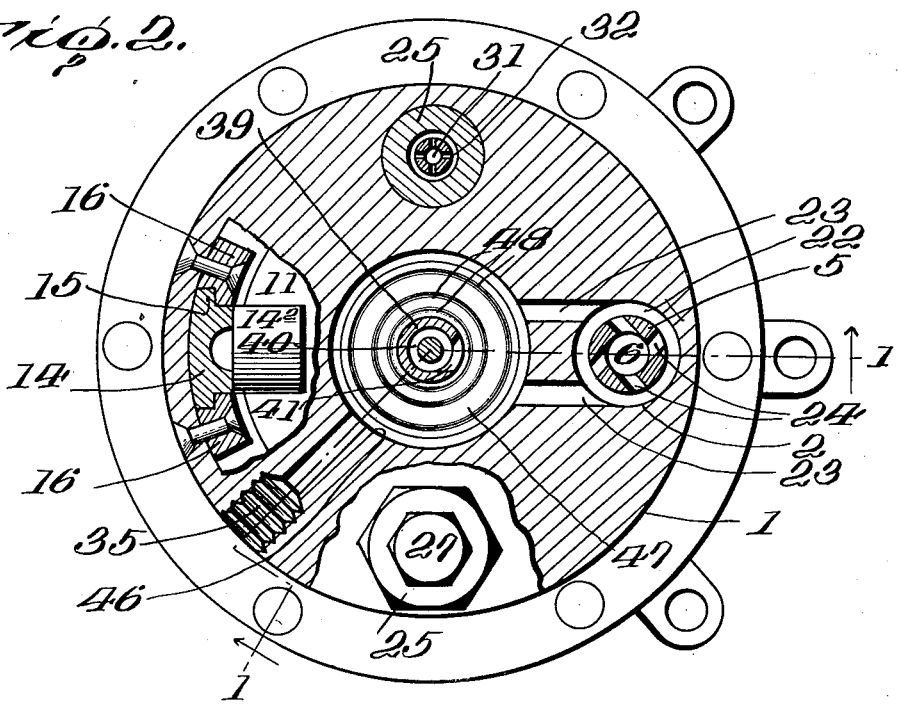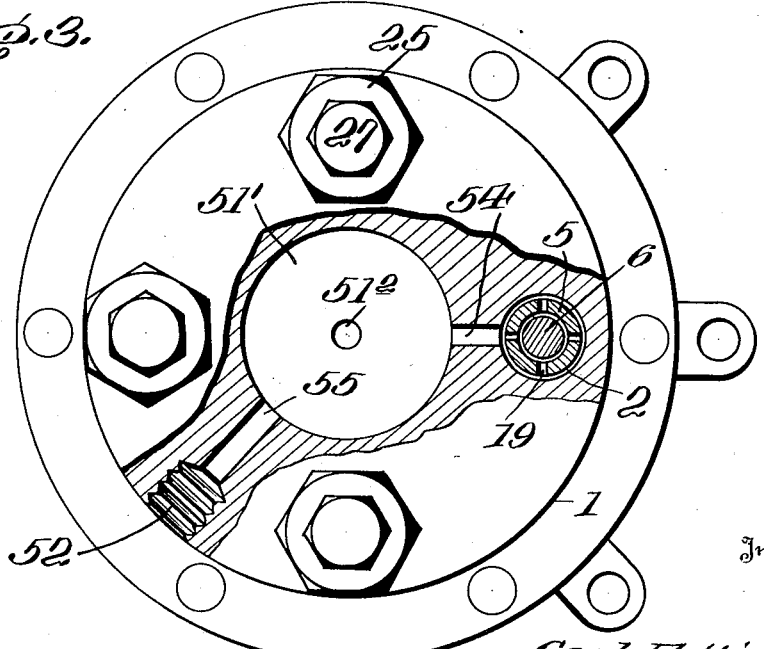

Dec. 13, 1938.  C. F. HIGH  2,139,894
FUEL INJECTION AND MIXTURE CONTROLLING APPARATUS
FOR INTERNAL COMBUSTION ENGINES
Original Filed Aug. 16, 1930  5 Sheets-Sheet 4
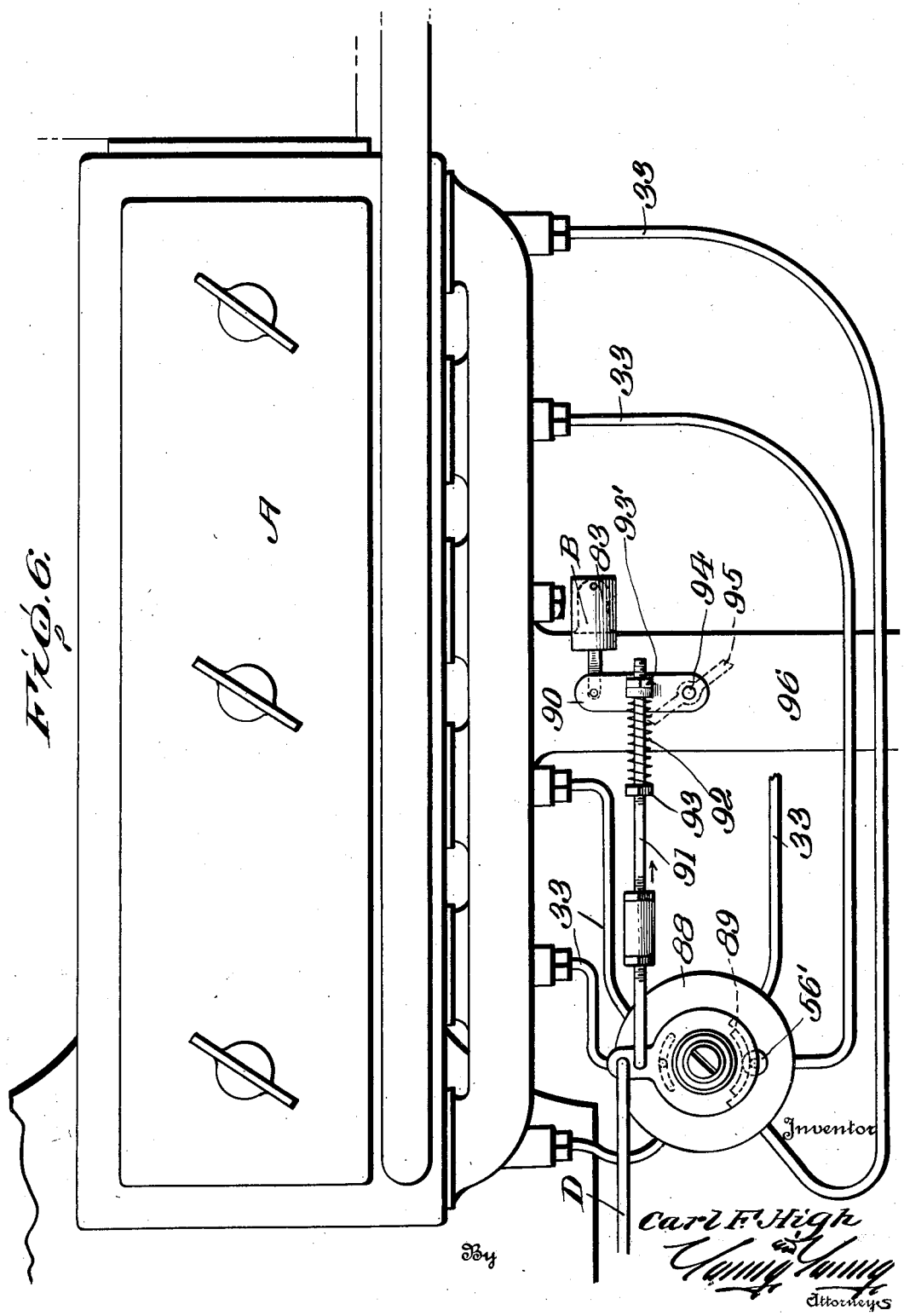

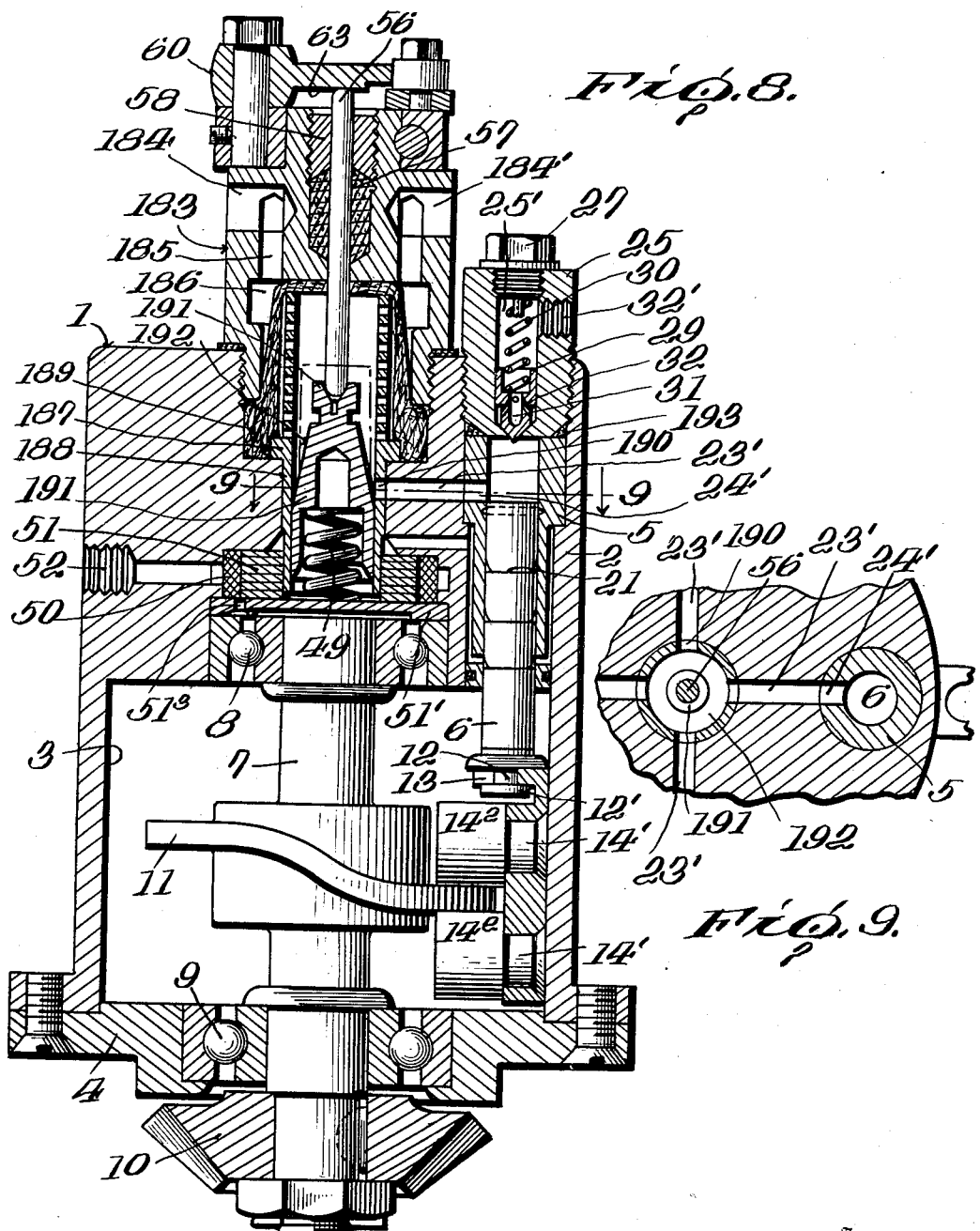

Patented Dec. 13, 1938

2,139,894

UNITED STATES PATENT OFFICE 2,139,894

FUEL INJECTION AND MIXTURE CONTROLLING APPARATUS FOR INTERNAL COMBUSTION ENGINES

Carl F. High, Flint, Mich.

Original application August 16, 1930, Serial No. 475,791. Divided and this application October 9, 1933, Serial No. 692,889

4 Claims. (Cl. 123—139)

This invention relates to a fuel injector and mixture controlling apparatus for internal combustion engines of the spark ignition type and constitutes a division of my allowed application for Fuel pump, filed August 16, 1930, Serial Number 475,791, and is a companion application of an application executed even date herewith.

The main object of the invention is to provide a simple, positive and accurate apparatus for delivering the fuel charge to an internal combustion engine of the spark ignition type which is self-adjustable to varying load and is provided with means for temporarily increasing the richness of the mixture upon the sudden opening of said fuel throttle for materially increasing the acceleration of the engine to which the fuel injector and mixture controlling apparatus is attached.

Another object of my invention is to provide a fuel injecting and mixture controlling apparatus for internal combustion engines of the spark ignition type employing a pump composed of a plurality of pumping elements driven and timed by the engine provided with a common fuel supply for all of said pumping elements and having a single metering member for controlling the supply of fuel to the intake of said pumping elements cooperating with air controlling means of the internal combustion engine for accurately controlling the mixture ratio throughout the various ranges of speed and load in connection with means for retarding the air controlling means for increasing the richness of the mixture for accelerating the engine.

The principal element to be considered is that of time, and it has been determined that this characteristic is of such a nature, and functions in the present apparatus, to render the pump self-adjustable to varying load and by providing means for retarding the opening movement of the air throttling means, the proportion of fuel to air can be increased for accelerating the engine.

It should be apparent that my device employs the same principle of quantity regulation for fuel admitted to the injector pumps as that which is employed in the use of an air throttle for the admission of air to the engine during the induction cycle. The injector pumps are of fixed displacement just as the engine is of fixed displacement, therefore it follows that for a given restriction of air throttle to the engine, and fuel throttle to the distributing chamber, that the quantities admitted during the suction stroke (or induction cycle) will be in direct relation regardless of speed or load requirements. The amounts of air and fuel admitted to the respective units will be in direct proportion to the elapsed time of the induction cycle, or intake stroke.

It will be apparent that with the air throttle set at its minimum open position for extreme low idling speed, the engine cylinders will be completely filled with air, irrespective of this position of air throttle, if a sufficient time was allowed for air admission during the induction cycle. In other words, if the engine were rotating very slowly, the cylinders would become completely filled and it follows in direct order of reasoning that the injector cylinders would also be completely filled with fuel if a similar position of fuel throttling existed at the entrance to the distributing chamber and the same time allowance, or the same rotating speed were maintained, the injector cylinders would be completely filled with fuel. Therefore, the introduction of fuel to match the air drawn in by the engine would maintain the predetermined desirable mixture ratio, since the stroke of the injector pistons and their diameter is a factor of the maximum fuel required for the maximum air inducted by the engine. Furthermore, the injector speed is always in direct proportion to the engine speed. The injector is a two stroke cycle pump and when employed with four stroke cycle engines, the ratio of engine to injector speeds is preferably two to one, and when the injector is employed with a two stroke cycle engine, the ratio of engine to injector speeds is preferably one to one, or direct.

For out-of-phase fuel injection other pump speeds may be employed, and for step-up fuel injection the injector may be driven at twice the cam shaft speed, thus supplying the fuel for twice as many cylinders as there are pump units, which permits one pump unit to supply the fuel for two cylinders, inhaling from one Siamese port, or from one Y induction pipe.

In constructing a fuel injector and mixture controlling apparatus for an internal combustion engine as clearly shown and described, all of the advantages set forth in my companion application executed even date herewith are obtained and an additional means provided for facilitating the acceleration of the engine to which the apparatus is attached.

Other and further objects and advantages of the invention will be hereinafter set forth and the novel features thereof defined by the appended claims.

In the drawings,

Figure 1 is a vertical section through a pumping unit having a plurality of pumping elements used in connection with a fuel feeding system;

Figure 2 is a section taken on line 2—2 of Figure 1;

Figure 3 is a top plan view with parts broken away and is a section taken on line 3—3 of Figure 1;

Figure 4 is a plan elevation of the fuel metering control illustrating diagrammatically the connection with the air intake control, parts being broken away and in section to more clearly illustrate structural features;

Figure 5 is a detail section taken on line 5—5 of Figure 4;

Figure 6 is a diagrammatic view of an internal combustion engine showing a simplified construction of fuel metering and throttling control;

Figure 7 is a detail view of a calibrated fuel air cam used in connection with the simplified construction disclosed in Figure 6;

Figure 8 is a vertical section through another form of pumping unit having a plurality of pumping elements capable of being used in connection with a fuel feeding system; and Figure 9 is a detail section taken on line 9—9 of Figure 8.

In the embodiment of my invention as shown in the drawings, I have illustrated a pumping unit containing a plurality of pumping elements forming a part of a fuel feeding system wherein a single fuel controlling element of the pumping unit cooperates with air controlling means to render the fuel feeding system self-adjustable to varying load and is provided with means for retarding the opening movement of the air valve so as to increase the richness of the mixture to facilitate the acceleration of an internal combustion engine to which my improved construction of fuel injector and mixture controlling apparatus is attached.

In the drawings 1 indicates a pump casing which is preferably circular in shape and has arranged annularly at spaced intervals a plurality of vertical bores 2 adjacent its periphery, which bores communicate with a circular recess 3 formed in the lower part of the casing. The circular recess 3 formed in the lower part of the casing is closed by a cap 4, bolted or otherwise secured to an annular flange formed on the bottom of the casing as clearly shown in Figure 1. Mounted within each of the bores 2 is a bushing 5 which constitutes a pump cylinder or barrel having slidably mounted therein a piston 6 which is adapted to be reciprocated as will be hereinafter fully described.

Journalled centrally within the lower portion of the pump casing 1 is a cam shaft 7, the upper end of which is mounted in an anti-friction bearing 8, while the lower end is journalled in an anti-friction bearing 9 mounted within the cap 4. A suitable gear or pinion 10 is secured to the protruding end of the cam shaft and is adapted to mesh with a pinion or gear (not shown) driven by the engine so as to form a driving connection between the cam shaft and the internal combustion engine whereby in operation the annular cam 11 carried by the cam shaft within the recess 3 will serve to actuate the pistons 6 as hereinafter more fully described.

The lower end of each piston 6 is provided with a reduced shank 12 which is straddled by a bifurcated ear 13 carried by a cross head 14. A head 12' formed on the end of the reduced shank 12 serves to secure the pump piston 6 to the cross head as clearly shown in Figure 1.

As clearly shown in Figure 2, the cross head 14 is provided with a flanged head 15 which travels in grooved ways 16 secured to the inner wall of the housing 1 in any suitable manner, such as by riveting or the like. Each cross head 14 carries a pair of vertical spaced studs 14' upon which are mounted rollers $14^2$ which engage the upper and lower face of the annular cam 11. This is clearly illustrated in Figure 1 of the drawings and obviously, as the cam shaft and cam 11 are rotated, vertical reciprocating movement will be imparted to the cross head 14, which in turn effects reciprocated action of the piston 6 within the cylinder 5 whereby the fuel is drawn into the cylinder and injected into the engine as the pump is operated in timed relation with the engine as will be hereinafter fully described.

The cylinder bores 2 are provided with shoulders 17 upon which the enlarged heads 18 of the bushings 5 are seated as clearly shown in Figure 1. The outer diameter of each bushing is restricted to form an annular oil space around the bushing intermediate the shoulder 17 and the lower end of the cylinder bushing 5, which space communicates with the interior of the cylinder adjacent its lower end through radial openings 19 whereby the engaging surfaces of the cylinder and piston are lubricated as will be later described.

The lower end of the cylinder bushing 5 snugly fits within the bore 2 and in addition thereto a packing ring 20 may be utilized to form a tight connection to prevent oil from draining from the oil space surrounding the bushing.

As clearly illustrated in Figure 1 the pistons 6 are provided with a plurality of vertically spaced annular grooves 21, the upper surfaces of which are either tapered or rounded outwardly towards the outer periphery of the piston while the lower edge forms a sharp angle whereby on the upward movement of the piston, the oil fed into the cylinder will be picked up by the lower edge of the groove and carried upwardly the distance of the piston stroke as obviously on the down stroke of the piston due to the top tapered surface of the groove 21, a thin film of oil will remain upon the wall of the cylinder at the point to which it has been previously raised for lubricating the same.

From the foregoing description it will be readily seen that the oil fed into the lower portion of the cylinder through the radial openings 19 will be picked up by the lowermost groove 21 of the piston and carried up the cylinder the height of the piston stroke which is approximately the distance between the oil grooves 21. Each successive stroke of the piston will carry the oil higher within the cylinder, thus effectively lubricating the cylinder wall throughout the entire length of its bore.

The groove 19' formed in the bushing adjacent the fuel intake ports of the cylinders, serves as an oil reservoir receiving its oil supply from the top groove in the piston which on its up stroke by passing the same, the oil in the annular groove 19' lubricates the tip of the piston as it passes on each down stroke and on its up stroke. The tip of the piston carries oil from the groove to the wall of the cylinder above the intake port. The groove 19' also prevents fuel which might possibly leak past the tip of the piston from leaking below the groove inasmuch as the pressure in the groove is increased because of the necessary pressure required to cause leakage of the fuel, therefore any leakage from the groove would tend to be past the short distance between the groove and the intake port rather than down the much greater distance to the oil intake openings of the bottom of the cylinder.

It will, therefore, be seen that the groove makes possible piston lubrication at a pressure less than the downward pressure of the fuel on the piston, with no leakage or washing of the oil film off the piston or cylinder wall below the groove.

The enlarged head of the cylinder bushing 5 is provided with an annular groove 22 which registers with the tangential ducts or passages 23, thus as fuel is fed through the duct 23 as will be hereinafter fully described, the same entirely surrounds the groove 22 which communicates with the interior of the cylinder through the tangential openings 24, thus as the piston 6 travels upwardly and displaces fuel prior to closing the inlet 24, the expelled fluid will be rotated within the annular groove and as the portion of the fluid endeavors to return through one of the tangential ducts extending in the direction of rotation of the fluid, the same will be replaced by fluid through the opposing duct, thus insuring a full supply surrounding the inlet port 24 at all times regardless of the method of metering.

The cylinder bushing 5 is held upon the shoulder 17 by means of a threaded head 25 which engages the packing ring 26 forming a liquid-tight joint to prevent leakage of fuel past the threads of the head.

The head 25 is provided with an annular bore 25' closed at its top by a threaded plug 27 and having its lower end terminating in a tapered seat 28 for reception of the valve 29. It will be noted that the valve 29 is provided with a recess for reception of a spring 30, which normally serves to hold the valve upon the tapered seat 28. It will be noted that the lower end of the valve 29 is restricted to provide a surrounding space, while the interior of the valve is provided with a central well 31 communicating with a restricted portion of the valve through the angular ports 32. Thus, as the piston 6 is forced upwardly within the cylinder, the fuel contained therein will lift the valve and then travel through the ports 32, resulting in an injection action to evacuate fluid within the well. Obviously, as the valve seats to cut off further supply, the evacuated area within the well will cause fluid above the valve to be drawn into the well, thus preventing dripping at the discharge end of the ejection nozzle (not shown), and insuring an immediate cut-off of fuel.

The head 25 is provided with a threaded port 32' in which is secured in a conventional manner a fuel line pipe 33, which line in turn is connected with a fuel injecting nozzle (not shown) for delivering fuel from the pump to the engine by either introducing the fuel into the air induction pipe of the engine or directly into the cylinders.

Taking up the fuel supply and metering, the housing 1 has provided in its upper end a central recess 34, to which fuel is supplied through the inlet port 35 that in turn is connected with any suitable source of fuel supply.

Extending upwardly within the recess 34 is a boss 36 surrounded by a screen 37 and having its upper end reduced and spaced from the screen. A cap 38', threaded into the recess 34 forms a closure therefor, and also serves to retain the screen 37 in place upon the boss 36.

The boss 36 is provided with a central bore in which is slidably mounted a metering sleeve valve 38 having a central well 40 and an outlet 41 communicating with said well. As best shown in Figures 1 and 2, the outlet 41 is of crescent shape formed by milling through the side of the valve with a baffle tool. Obviously, because of this shape, as the valve is depressed to expose the port 41 below the central bore of the boss 36, the opening will be gradual, thus controlling the proportion and volume of fuel admitted to the distributing compartment or chamber 46 formed below the boss 36.

Obviously, from the foregoing, as fuel enters the recess 34 through the port 35, the same will surround the screen 37, and after passing through the same to remove coarse impurities, the fuel will fill the well 40 within the valve 38, from which it is discharged to the distributing compartment or chamber 46, it being noted that the fuel must pass through the screen 37, inasmuch as the cap 38' forms a cover to prevent fuel from passing over the top of the screen.

Mounted within the central fuel distributing compartment or chamber 46, is a distributor head 47, the top of which is inclined upwardly towards the axis of the head, and provided with a plurality of annular grooves 48. It will be readily seen that as fuel is discharged into the distributing compartment, the annular grooves 48 will cause the same to be evenly distributed around the head, thus insuring a uniform supply of fuel to all of the ducts 23, which communicate with the cylinders 5.

While in the drawings I have shown a particular construction of metering valve for metering the fuel entering the distributing chamber, I am aware that various constructions can be used to accomplish this result without departing from the spirit of my invention and therefore I do not desire to limit myself to the use of any particular construction of metering valve.

The center of the head 47 is provided with a vertical bore for slidable reception of the lower end of the valve 38, which in turn is recessed to receive a coiled spring 49 normally urging the valve to closed position.

Below the head 47 is positioned an annular screen 50 within which is disposed a series of filter pads 51, which serve to filter oil through an inlet port 52 from any suitable gravity or pressure lubricant supply. The screen 50 and pads 51 are positioned between a pair of retaining discs 51', the upper disc being provided with a central opening $51^2$. Obviously, as the lubricating oil passes through the screen 50 and the pads 51, the same will pass through the opening $51^2$ into the interior of the distributor head 47, which, adjacent its lower edge, is provided with radial ports 53 that communicate with the oil ducts 54, which, in turn, communicate with the oil spaces surrounding the cylinder bushings 5. Thus, it will be seen that oil fed to the pump cylinders also serves to lubricate the metering valve 38 journalled within the central bore of the distributor head 47.

The actuating mechanism contained within the lower portion of the housing 1, as well as the lower bearing 9, receives its lubrication from oil discharged through a vertical duct 55 forming a communication between the oil inlet port 52 and the lower compartment.

Also, a portion of the oil passing through the filter screen and the filter pad may be fed to the anti-frictional bearing through an opening $51^3$, formed in the lower plate 51'. It will thus be seen that all moving parts are completely housed and thoroughly lubricated from a single source of supply.

For the purpose of exactly and minutely governing or metering the fuel supply of the various pump cylinders, the valve 38 is controlled by a metering pin 56, slidably journalled within the cap 38', and having its lower end engaged in a seat formed in the bottom of the well 40. A packing 57 and gland nut 58 serve to prevent leakage of fuel past the metering pin.

In order to effect actuation of the metering pin 56, several types of mechanism may be employed, as for example, the structure disclosed in Figures 1 and 4, wherein a bracket 59 is suitably mounted upon the top of the cap 38', and has pivotally secured thereon a double cam lever 60, the operation of which is manually controlled through a link 61 and a hand lever 62.

As best shown in Figure 1, and indicated by dotted lines in Figure 4, the lower end of the cam lever 60 is provided with an arcuate cam 63, the working face of which is inclined at an angle to a horizontal plane, and engages the upper end of the metering pin 56. It will be quite apparent that as the lever 60 is operated upon its pivot, the metering pin 56 will be reciprocated through action of the cam in one direction, and the spring 49 in the opposite direction, causing the metering valve 38 to be reciprocated within the boss 36 to vary exposure of the valve port 41 to meter the fuel supplied to the distributing chamber.

In practically all instances, it is desirable to correlate control of the air supply to the motor with the fuel control, and, therefore, one form of mechanism for accomplishing this has been illustrated in Figure 4, wherein the bracket 59 has clamped therein a tube 64, in which a rod 65 is slidably mounted and carries a slidably mounted member 66 to which the actuating lever 67 is pivotally connected by a pin 67', as shown in Figure 5. The bar 65 is surrounded above the slidably mounted member 66 by a coil spring 66', which is retained by a nut 66² threaded upon the end of the bar 65, and secured thereto in any suitable manner.

Rotatably mounted within the head, and secured thereto by screws 70, is a thumb nut 71 threaded upon the outer end of the rod 65. A pin 72, passing through the rod 65, and projecting into slots 73, formed in the end of the tube 64, serves to prevent radial movement of the rod 65, as the thumb nut is rotated to vary the fulcrum of the lever 67, whereby relative adjustment between the metering mechanism and throttle control is obtained.

Actuation of the lever 67 is effected by means of a roller 74 mounted thereon and engaging the lateral cam face 75 of the lever 60. For effecting control of the air supply to the motor, a flexible rod 76 is connected to the lever 67, adjacent its outer end by a ball or pin 67², and extends through a tube 77 also clamped within the bracket 59. The opposite end of the flexible rod 76 is in turn connected to a lever 78 which actuates the butterfly valve 79 mounted within the air supply pipe 80. A spring 81, connected to the outer end of the actuating lever 78, and a bracket 82, carried by the tubes, serves to normally hold the lever 67 against the cam face 75. Thus, upon rotation of the lever 60, in one direction, the cam 75 effects opening of the air valve 79, and in the opposite direction closing of the valve is obtained through a spring 81.

While control or actuation of the fuel metering pin is uniform at all times, under certain conditions, it is necessary to vary the supply of air with relation to the fuel, and this is accomplished in the structure illustrated by axial adjustment of the rod 65 through the thumb nut 71, which varies the fulcrum of the lever 67 with relation to the cam lever 60, thus enabling the operator to manually adjust or regulate the proportion of air to fuel without interfering with correlation of the control of the two.

In order to temporarily increase the proportion of fuel to air on the sudden opening of the fuel throttle for increasing the richness of the mixture for acceleration, I provide a fluid dash pot 83 which opposes the movement of the lever 67, which in turn retards the opening of the air throttle.

The dash pot 83 is a conventional structure provided with adjustable bleeds 84 formed in the top of the cylinder which is anchored by a stationary pin 85 herein shown carried by a bracket formed on the air intake. The piston 86 of the dash pot is pivotally mounted on the pin 67² which also attaches the flexible air control 76 to the lever 67. The lever is slidably fulcrumed upon the bar and is urged against the cam lever by the spring 66' mounted on the rod 65. The nut 66² threaded on the outer end of the rod serves to regulate the tension of the spring 66' so as to be able to adjust the yieldable connection between the lever and the rod.

In the operation should the cam lever be rapidly rotated to depress the metering pin 56, the outer face of the cam 75 will naturally rock the lever 67. However, due to the action of the dash pot-retarding movement of the outer end of the lever, which controls the air supply, the outer end of the lever 67 will remain substantially stationary while the fulcrumed end of the lever will move axially on the rod 65 against the tension of the spring 66' until the bleeds 84 allow gradual evacuation of the fluid opposing the piston 86. The return of the piston 86 is permitted through the check valve 87 provided therein so as to allow the dash pot to have substantially free movement in one direction.

Thus it will be seen that the air supply admitted to the manifold or any intake of the engine will be caused to lag behind the initial supply of fuel, thus materially increasing acceleration.

While I have shown and illustrated a particular construction of fluid dash pot, I do not wish to limit myself to the use of any particular form of dash pot for the retarding of the opening movement of the air valve for increasing the richness of the mixture for acceleration as I am aware that various constructions can be used without departing from the spirit of my invention.

In the simplified construction of hook-up between the air throttle and the fuel throttle, as disclosed in Figure 6, the manually operated disc 88 is provided with a cam 89, cooperating with the metering pin 56' for actuating the metering valve controlling the supply of fuel to the intake of the pumps, said disc being yieldably connected to the air throttle arm 90 by an adjustable link 91. The yieldable connection, as illustrated in Figure 6, is formed by providing the arm 90 with an eye through which the end of the adjustable link 91 extends. Mounted on the link 91 is a spring 92 disposed between the ear of the arm 90, and a nut 93 is threaded on the link, which serves to adjust the tension of the spring 92. A nut 93', threaded upon the outer end of the link 91, normally engages the ear of the arm 90. The purpose of the yieldable connection thus described is to provide a time lag between the fuel metering mechanism and the air throttle, during the opening operation, and at the same time provide positive closing of the air throttle in step with restriction of the fuel supply.

In the drawings I have shown the air intake 96 provided with a bracket for supporting the dash pot B employed for retarding the opening movement of the air valve to provide means for increasing the proportion of fuel to air upon the sudden opening of the fuel throttle, whereby a rich mixture will be produced to facilitate acceleration of the engine to which the apparatus is attached.

In the form of pump illustrated in Figures 8 and 9 which is capable of being used in producing a fuel injecting and mixture controlling apparatus for large internal combustion engines, the fuel supply is introduced into a concentric head 183 threaded into the top of the housing, the head being provided with inlet and outlet ports 184 and 184' respectively, the inlet port being connected to any suitable source of fuel supply while the outlet port is provided with any suitable connection for venting and preventing vapor lock.

From the ports 184, the fuel passes downwardly through the ducts 185 into a distributing chamber 186. Mounted within the distributing chamber is a shouldered sleeve 187, the lower end of which is fitted in a central bore 188 provided in the housing 1 and communicating with the distributing chamber. The upper end of the sleeve 187, projecting into the distributing chamber, is perforated, and surrounded by a filter cloth or screen 189, which is secured in position upon the top of the sleeve 187 by clamping engagement of the head 183.

In this form of the invention the tangential ducts 23, heretofore described, are eliminated, and the single radial ducts 23' are provided, which ducts register with radial ports 190 formed in the sleeve 187.

From the foregoing, it will be readily seen that fuel introduced into the ports 184 will pass into the distributing chamber 186, thence through the filtering screen 189 and the perforated upper portion of the sleeve 187 to surround the plug valve 191, slidably mounted within the sleeve.

Aside from the method of metering, the plug 191 is actuated similar to the valve 38, through the metering pin 56, which is actuated by the cam 63 carried by the cam lever 60.

Regulation of the fuel supply distributed through the ports 190 is obtained by means of the conical or tapered head 192 of the plug 191, which, as the plug is vertically actuated by means of the metering pin 56 and the opposed spring 49, will effect gradual opening or closing of the ports 190.

Another distinction residing in this form of the invention, is the method of packing or sealing the connection between the fuel discharge head 25 and the cylinder bushing 5. As shown in Figure 8, the peripheral lower edge of the head 25 is chamfered or bevelled off, thus providing an annular space between the head and cylinder bushing, which is triangular in cross section. Prior to threading the head 25 into the casing, a ring of soft metallic material, such as solder wire or the like, and of less area cross section than the cross section area of the annular space between the head and cylinder bushing, is positioned on top of the cylinder bushing. Obviously, upon turning the head down upon the packing ring 193, the latter will be compressed to conform to the shape of the annular space between the head and bushing, which, being triangular in cross section, will provide a secure, three point contact between the bushing ring 193 and the triangular faces of the annular space between the head and bushing.

It will also be noted that in this form of the invention, the annular groove 22, provided in the bushing 5, as illustrated in Figure 1, is eliminated, and a single inlet port 24' is provided, which communicates with the radial duct 23' and is of the same diameter or cross sectional area, the advantages of which will be later described more in detail.

In this form of the invention under consideration, the method of lubrication remains the same as that described in connection with the structure shown in Figure 1, and therefore needs no further explanation. Also, the manner of actuating the pistons 6 remains the same, as well as the structure of the fuel discharge head 25 and the valve 29.

In the embodiment of my invention as shown in Figures 8 and 9, a single conical metering member is mounted for opening and closing independent induction ducts leading to the respective pump cylinders whereby I am able to simultaneously open and close these ducts to control the supply of fuel on the suction side of the pump and by having means for operating this metering member in relation to the operation of the air control of the internal combustion engine, I am able to produce a fuel feeding system for internal combustion engines of the spark ignition type which is self-adjustable to varying load and I wish it to be clearly understood that this form of pump can be substituted for the form of pump shown in Figures 1, 2 and 3 so as to produce a fuel feeding system having the advantages claimed therefor.

The manually controlled disc 88 is adapted to be connected by a rod D to the accelerator or throttle control of an internal combustion engine to which the fuel injecting and charge forming apparatus is connected so as to be under the control of the operator whereby when the accelerator is operated quickly so as to open the fuel valve of the injector, the opening movement of the air controlling valve will be retarded so as to produce a rich explosive mixture for acceleration.

The varying load at fixed throttle of all automotive engines, and which is instantly reflected in their speed, is provided for by the time characteristic of the metering orifice. Thus from any fixed throttle position, as the load is decreased the speed automatically increases, and, due to more piston inductions from the manifold, the manifold depression increases and the weight of air per cylinder induction decreases, in spite of the increased flow into the manifold due to the higher vacuum. Were there a fixed amount of fuel per induction delivered to the manifold under this condition, the charge would grow increasingly rich as the speed increased. Approaching the other extreme, if from any fixed throttle position the speed is reduced with the application of load, the pistons inhaling less often from the manifold, the manifold depression decreases and the weight of air per induction is increased. Under this condition, with a fixed amount of fuel per induction, the charge would grow constantly leaner as the speed decreased, until the fuel-air proportion would be so badly disturbed that the engine would backfire and stall. With the time element of suction metering, these conditions of varying loads are automatically compensated for without resorting to the auxiliary compensating expedients required by other forms of fuel feeding systems.

In calibrating the suction metering pump against the air requirements of an engine, a certain procedure is desirable. This is appreciated when it is realized that there must be provided two distinct pumps in one, which must both be calibrated for maximum results. The one pump is the part throttle pump in which the fuel metering cam is generated to keep the fuel in proportion with the air being inducted through the air throttle opening at that instant. The other pump is the maximum delivery pump, this pump being the composite of the pump displacement less the correct metering orifice constriction which positively assures the correct fuel-air proportion at the extreme top of the speed range. The pump displacement is made to match the wide open throttle air requirements in the lower portion of the speed range, thus there is a close matching of the air requirements throughout the entire range. Both pumps when once determined are fixed in design and must so remain throughout their life of service.

In a pump embodying the principles described, suction metering is initiated at the constricted orifice, communicating with the common distributing chamber, and to obtain the most desirable results this orifice should be positioned as close to the distributing chamber as possible, and the distance between the distributing chamber and the pump cylinders should be reduced to a minimum, which is obtained in the present pump by the concentric arrangements of the pump units about the distributing chamber. The advantage of this arrangement resides in the fact that it has been definitely determined that the volume of fuel between the common metering orifice, and the intake sides of the pumps must be limited to a minimum in order to reduce displacement and eliminate lag.

The broad invention disclosed in this application consists of a fuel feeding and mixture controlling means especially adapted to be used in connection with multiple cylinder spark ignition variable load internal combustion engines as used in connection with motor vehicles where the flexibility demands are the greatest and while I have shown and described one embodiment of my invention applied to this type of internal combustion engine, I do not wish to limit myself to the use of the fuel feeding system in connection with any particular type of engine and therefore I do not wish to limit myself to the particular construction disclosed or its particular use as my invention consists in metering fuel on the suction side of a plurality of pumping elements by a single metering member and definitely connecting said metering member to the aid controlling means of the engine for rendering the apparatus self-adjustable to load and by having means for increasing the richness of the mixture for acceleration by retarding the opening of the air controlling means, I am able to use my apparatus in connection with variable load internal combustion engines.

While in the drawings I have failed to show any form of nozzle for spraying fuel either into the air intake or the cylinders of the engine, it is, of course, understood that the fuel conduits 33 leading from the pumping elements terminate in fuel nozzles of the desired construction, such as shown and described in my original application, and therefore I wish it to be clearly understood that my fuel injection and mixture controlling apparatus contemplates the use of some form of nozzle for spraying the fuel delivered to the engine by the injecting system.

In my companion application filed even date herewith covering a fuel injecting and mixture controlling apparatus for internal combustion engines, I have set up in detail the advantages obtained by utilizing a pump having a single member for metering the supply of fuel to a plurality of pumping elements and as the construction disclosed in this application is similar to that disclosed in my companion application, it is of course, understood that all of the advantages set forth in my companion application are obtained by the construction set forth in this application and in addition to said advantages I have provided means for increasing the richness of the mixture for acceleration.

What I claim is:

1. A charge forming means for internal combustion engines having, in combination, a pumping unit having a plurality of pumping elements driven and timed by the engine, a common fuel supply for said pumping elements, a single metering member for controlling the supply of fuel to said common fuel supply, means for controlling the admission of air to the engine, means for conveying fuel from said pumping unit to said engine, a yieldable mechanical connection between said air controlling means and said fuel controlling means and means for retarding the movement of the air controlling means in one direction for increasing the proportion of fuel to air for accelerating the engine.

2. A charge forming means for internal combustion engines comprising, in combination, a pump for delivering fuel under pressure to the engine, means for delivering air to the engine, a manually operable fuel throttling means for metering the fuel delivered to the engine by said pump, an air throttling means for metering air delivered to the engine, a yieldable connection means between said fuel throttling means and said air throttling means for rendering the air throttling means responsive to manual operation of the fuel throttling means, and a dash pot arranged to temporarily retard the movement of said air throttling means when said fuel throttling means is suddenly moved to increase the supply of fuel to the engine.

3. A charge forming means for internal combustion engines comprising, in combination, means for delivering fuel under pressure to the engine, fuel throttling means, means for delivering air to the engine, an air throttling means for controlling air delivered to the engine, a yieldable connection between said fuel throttling means and said air throttling means for rendering the air throttling means responsive to manual operation of the fuel throttling means comprising a lever, means providing a yieldable support for one end of the lever, and a dashpot for temporarily retarding movement of the free end of the lever, and manually operated means for simultaneously actuating one of said controlling means and said lever.

4. A charge forming means for internal combustion engines comprising, in combination, a device driven and timed by the engine for supplying fuel under pressure to the engine, means for controlling the supply of air to the engine, manually operated means for controlling the feed of fuel to the engine by said device, and an operative connection between said air controlling means and said fuel controlling means for temporarily delaying opening movement of the air controlling means upon sudden opening movement of the fuel controlling means for increasing the richness of the mixture upon accelerating the engine, said connection comprising a lever, yieldable means for pivotally supporting one end of the lever, means connecting the free end of the lever to the air controlling means, a cam operable by said fuel control operating means and engageable with an intermediate portion of said lever, and a dashpot for temporarily retarding the movement of the free end of the lever by said cam.

CARL F. HIGH.